US008301299B2

(12) United States Patent
Lager et al.

(10) Patent No.: US 8,301,299 B2

(45) Date of Patent: Oct. 30, 2012

(54) ROBOT SYSTEM

(75) Inventors: Anders Lager, Västeras (SE); Fredrik Kange, Västeras (SE); Heiko Koziolek, Karlsruhe (DE); Roland Weiss, Schriesheim (DE)

(73) Assignee: ABB AG, Mannheim (DE)

( * ) Notice: Subject to any disclaimer, the term of this patent is extended or adjusted under 35 U.S.C. 154(b) by 0 days.

(21) Appl. No.: 13/238,836

(22) Filed: Sep. 21, 2011

(65) Prior Publication Data

US 2012/0029688 A1 Feb. 2, 2012

Related U.S. Application Data

(63) Continuation of application No. PCT/EP2009/002706, filed on Apr. 11, 2009.

(51) Int. Cl.

| | |
|---|---|
| ***G06F 19/00*** | (2006.01) |
| ***G06F 7/00*** | (2006.01) |
| ***G06F 9/46*** | (2006.01) |
| ***G05B 19/418*** | (2006.01) |
| ***G05B 19/18*** | (2006.01) |

(52) U.S. Cl. ........ 700/230; 700/248; 700/245; 700/223; 700/2; 718/100

(58) Field of Classification Search ........................ None
See application file for complete search history.

(56) References Cited

U.S. PATENT DOCUMENTS

| | | | | |
|---|---|---|---|---|
| 6,328,523 | B1 | 12/2001 | Watanabe et al. | |
| 7,177,459 | B1 | 2/2007 | Watanabe et al. | |
| 2003/0220715 | A1 * | 11/2003 | Kneifel et al. | 700/248 |
| 2006/0101465 | A1 * | 5/2006 | Kato et al. | 718/100 |
| 2008/0208361 | A1 | 8/2008 | Grgic | |

OTHER PUBLICATIONS

International Search Report (PCT/ISA/210) issued on Dec. 15, 2009, by European Patent Office as the International Searching Authority for International Application No. PCT/EP2009/002706.

* cited by examiner

*Primary Examiner* — Gene Crawford
*Assistant Examiner* — Yolanda Jones
(74) *Attorney, Agent, or Firm* — Buchanan Ingersoll & Rooney PC

(57) ABSTRACT

A robot system is disclosed which includes at least two robots, each having a related processing unit. The processing units are connected to each other via a network bus for data transmission, and distributed sensors are provided for gathering first and/or second measurement data within a local extension of the robot system. First measurement data gathered by at least one first sensor are transmissible to at least one processing unit related thereto. Second measurement data gathered by at least one second sensor are feedable into the network bus and provided to the at least two processing units connected thereto. The processing units can analyze the second measurement data as a variable dynamic share of workload for feeding result-data of the analysis into the network bus.

20 Claims, 1 Drawing Sheet

ROBOT SYSTEM

RELATED APPLICATION

This application claims priority as a continuation application under 35 U.S.C. §120 to PCT/EP2009/002706 filed as an International Application on Apr. 11, 2009 designating the U.S., the entire content of which is hereby incorporated by reference in its entirety.

FIELD

The present disclosure relates to a robot system having at least two robots and a related processing unit each, where the processing units can be connected to each other via a network bus for data transmission and a distributed sensor can be used for gathering first and/or second measurement data within the local extension of the robot system, whereas first measurement data gathered by at least one first sensor means are transmissible to at least one processing unit related thereto.

BACKGROUND INFORMATION

It is known that robots or manipulators are used in industrial applications such as the assembly of workpieces to a final product, the packaging of small objects or the grading of small objects. A robot can include several degrees of freedom in movement, for example three or six, but also manipulators with only two degrees of freedom or with seven and more degrees of freedom in movement. Each robot can be controlled, for example, by a dedicated robot controller.

A robot with three degrees of freedom in movement, for example, may have the ability to move an interface platform on the tip of the robot arm in three geometrical dimensions within its working range. For some applications a gripper tool is mounted on the interface platform. This type of robot can be suitable for so called pick and place applications whereas the robot is arranged, for example, over a conveyor belt transporting a plurality of individual small objects to be picked from the conveyor belt and to be packaged afterwards. Those robots may have a working range of, for example, +/−50 cm in each dimension whereas several and parallel working robots can be arranged along the conveyor belt. A similar application is, for example, disclosed in U.S. Pat. No. 6,328,523.

Of course, robots with six or seven degrees of freedom in movement are also suitable for such applications. But those robots are bigger and have a working range of for example 3 m around their rotary base. A known application for those robots is for example the assembly of car bodies in the automotive industry.

These robot applications can include for their control, but also due to safety aspects, a sensor based feedback from their working environment, where a plurality of different suitable sensor types is known. The feedback signal could be for example based on a light barrier around the robot which covers some security aspects to prevent incidents with personnel. But also cameras are known sensors for generating a feedback signal, especially for pick and place applications. In this case the stationary cameras observe the small objects moving along on the conveyor belt. The pictures from the camera can be analyzed permanently concerning the number, type and position of the small objects on the moving conveyor belt. Based on this analysis, the robots pick selected objects from the conveyor belt and place them for example in a package to which they belong. A robot system having an image processing function is disclosed for example in U.S. Pat. No. 7,177,459.

Such an analysis can be performed by a dedicated processing unit connected to the sensors, which analyzes all measurement signals. The effort of analyzing those data is strongly dependent on the kind and density of the objects on the conveyor, so the analyzing effort for one sensor may be at one time significantly higher than for another sensor and some time later significantly lower. Some data may have to be analyzed in real-time, such as security relevant data within not more than a few ms. Other data are less time critical and can involve for example an analysis only within a few 100 ms or some seconds.

Known processing units might become a bottleneck for the whole process in the case where an unexpected high amount of data has to be analyzed at the same time, so that the analysis of some data might be delayed and can not be considered in the robot control. In an exemplary worst case, the production process has to be temporarily stopped.

SUMMARY

A robot system is disclosed comprising: at least two robots each having a related processing unit, the processing units being connected to each other via a network bus for data transmission; and distributed sensor means for gathering first and/or second measurement data within a local extension of the robot system, the first measurement data gathered by at least one first sensor means being transmissible to at least one of the processing units related thereto, and second measurement data gathered by at least one second sensor means being feedable into the network bus and provided to the at least two processing units connected thereto for analyzing the second measurement data as a variable dynamic share of processing unit workload, the at least two processing units being configured to feed analysis result-data into the network bus.

A method for analysis of the measurement data of distributed sensors is also disclosed in a robot system having at least two robots, each with a related processing unit, the method comprising: gathering second measurement data by at least one second sensor; feeding the second measurement data into a network bus for data transmission; providing the second measurement data to at least two processing units of the at least two robots connected to the network bus for data transmission; analyzing the second measurement data by the at least two processing units as a variable dynamic share of workload among the processing units; and feeding analysis result-data of the processing units into the network bus.

BRIEF DESCRIPTION OF THE DRAWINGS

The invention will be further explained by way of exemplary embodiments and with reference to the accompanying drawings, in which.

DETAILED DESCRIPTION

Figure 1:
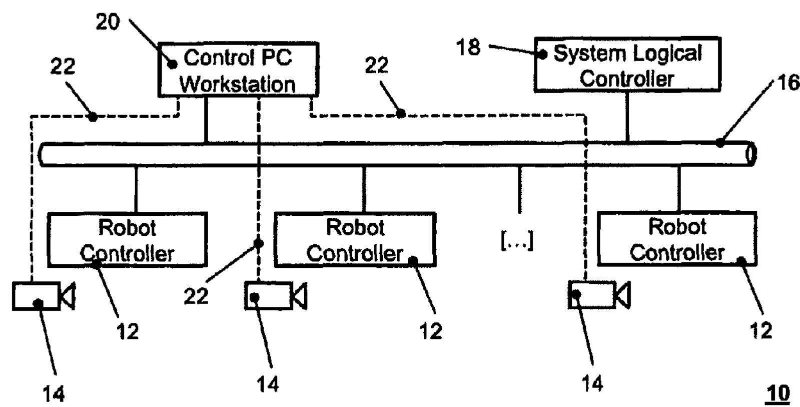
FIG. 1 shows an exemplary control structure for a known robot system.

A robot system is disclosed wherein second measurement data gathered by at least one second sensor means are feedable into a network bus and provided to at least two processing units connected thereto for analysis of the second measurement data as a variable dynamic share of workload among the processing units, the at least two processing units being configured to feed result-data of the analysis into the network bus.

In this case, an entire effort for analysing the measurement data is integrated into the robot controllers respective processing units which can be similar for example to a personal computer (PC) or workstation.

The robot controllers can have integrated therein additional software for sensor data analysis (also called Integrated Vision) and control logic to distribute the analysis results to the other controllers in the network. In known robot systems, the controllers were considered to have too limited processing power to carry out additional tasks besides controlling robot movement.

Hence a control unit or control PC which is dedicated only for data processing and analyzing can in principal be totally avoidable whereby the effort for hardware and the number of specified components can be advantageously reduced.

The static sensor data distribution of the first measurement data refers to fixing the relation between sensors and processing units during commissioning the robot system. Static in this case, refers to some special first measurement data of one or more selected sensors are assigned to a certain processing unit. This distribution is not changed at runtime. The static assignment of processing units to sensors has to consider the overall robot system. For example, first measurement data should only be analyzed by processing units, which can make use of the analysis results, so that there is limited need for transferring these results to other processing units. This can be important to keep the network traffic in the system on an acceptable level. Safety relevant measurement data are very often first measurement data which have to be analyzed in real-time without any avoidable delay, whereas a delay of for example 10 ms can be seen as real-time.

It is however in some cases desirable to connect a single sensor to as many processing units as possible (for example in a given robot line), so that the static sensor data distribution of the first measurement data can also be performed over the network bus for data transmission.

The second measurement data can be in any case dynamically distributed over a sensor network respectively to the network bus for data transmission. All processing units which are connected to the network bus for data transmission are capable to receive the second measurement data from the network bus and are also capable to analyze those data. The measurement data of cameras for example are very often second measurement data, which are not safety relevant and whereas a time delay of a few 100 ms and in some cases also up to some seconds is acceptable.

Hence it is possible in an advantageous way to ensure the analysis of possibly time-critical first measurement data on one side, and on the other side to dynamically use calculation capabilities of the processing units connected to the network bus for data transmission. The data traffic on the network bus can be kept as low or nearly as low as possible by the splitting of measurement data into first and second measurement data.

In an exemplary variant, the robot system can include at least one conveyor belt for the transportation of small objects and the at least two robots can be used for pick and place applications of small objects.

In such a robot system, exemplary advantages are notably relevant, since the workload for the processing units to analyze the measurement data may extremely vary dependent on the actual conditions of the production process.

If for example the robot system includes five robots for pick and place applications which are arranged along a moving conveyor belt and a box with small objects is dumped on it, an effort for analysing measurement data for example from cameras will move together with the cluster of small objects along the conveyor belt.

So at the beginning of this process the effort for analysing the measurement data of the first camera along the conveyor belt will be the highest since the initial cluster of small objects is within the viewing angle of the first camera. At the same time only an empty conveyor belt might be within the viewing angle of the last camera, so that the effort for analyzing those measurement data will be rather low. If the cluster has moved to the end of the conveyor belt into the working range of the last robot the cluster might be significantly reduced since the other four robots have already picked most of the small objects from the conveyor belt. Nevertheless the relative highest effort for analyzing measurement data will be involved at this moment for the last camera observing the rear of the conveyor belt.

In case of an exemplary continuous flow of small objects the first camera will involve the highest effort for analyzing their measurement data whereas the last camera will always involve the lowest effort.

A camera, a light sensor or a weight sensor are examples for sensors, which are suitable to gather measurement data within such a robot system.

In an exemplary embodiment of the robot system, the processing unit related to the robot is a robot controller. It includes processing means (e.g., specially programmed computer or software module) with the ability of processing and analysing measurement data as already mentioned.

According to another exemplary variant, at least one further processing unit, which is not related to a robot, is connected to the network bus for data transmission and is configured to analyze the second measurement data in the manner of a variable dynamic share of workload among the processing units whereas those processing units are configured to feed result-data of the analysis into the network bus.

If the robot related processing units do not provide the specified amount of calculation capability, this further processing unit can provide additional capability, whereas this further processing unit is fully involved into the dynamic distribution of the workload among the processing units. Therefore all advantages as described before are fully applicable also for this exemplary embodiment.

According to a further exemplary embodiment, the first measurement data of the at least one first sensor means are transmissible via a separate data line and/or the sensor network respectively the network bus for data transmission to a processing unit related thereto. The direct connection via a separate data line on the one side enables a fast transmission of first measurement data without generating data traffic on the network. The connection over the network on the other side enables an increased flexibility.

Dependent on the frame conditions, it is therefore possible to optimize the data transfer structure of the robot system in an advantageous way.

According to an exemplary variant, at least the second measurement data are provided with a timestamp. Since there is no exactly known delay for second measurement data in-between gaining those data and analyzing those data—for example 10 ms . . . 1000 ms—it is rather difficult to merge the results of the analysis of the second measurement data together as basis for the control of the robots. A timestamp will enable such synchronization of measurement data respectively with the results of their analysis. This strategy involves a synchronization of the clocks of the involved processing units and external sensors, but does not need to involve a communication between the processing units for distributing the sensor data.

In a further exemplary variant the variable dynamic share of workload for the analysis of second measurement data among the processing units is adjustable according to the actual un-used workload capacities of the processing units.

To achieve a balanced load or workload among the processing units, it can be desirable to distribute sensor data samples mainly to underutilized processing units. The utilization of the processing units might be different because of the setup of the robot line. For example, the last robot controller in a robot line might not have to handle many robot movements, because most items would already be picked by former robots. Additionally, different robot controller types with different responsibilities might be involved in a single robot line leading to different controller utilizations.

According to a further exemplary variant the analysis of second measurement data includes a plurality of solitary and exactly defined working packages. Such a working package could be for example the analysis of a picture frame of a camera.

For such image data it may not be desirable to split single frames and distribute these sub frames to different processing units for analysis because the effort for merging the results and the possibility for having a single item spread of multiple sub frames do not compensate the benefit from faster analysis in current state of the art setups. The effort for one working package shall not exceed a certain workload to ensure the prompt analyzes through the relevant processing unit.

In another exemplary variant, the workload for the analysis of second measurement data among the processing units is adjustable according to a round-robin method.

Sensor data can be sent to the processing units in a round-robin fashion, meaning that each processing unit receives a data sample after another. This strategy includes each processing unit triggering the subsequent processing unit receiving the next data sample. This trigger can be sent out after downloading a data sample from the sensor, but before processing it. This strategy involves the processing units communicating with each other as the distribution logic cannot be included into the existing exemplary standard sensors.

According to another exemplary embodiment, the processing units are configured to request new second measurement data from the second sensor means if they have un-used workload capacities.

Therefore each processing unit first analyzes its current load and then decides according to some configurable threshold, for example 80 percent CPU utilization, whether to retrieve the next data sample from an external sensor, or whether to trigger a subsequent processing unit to take over.

According to an exemplary embodiment, the result-data of the analysis of the second measurement data fed into the network bus are storable in the further processing unit and are transmittable from there to dedicated robot controllers via the network bus.

Since such further processing units might provide a rather high calculation capacity it is useful to assign such a processing unit to merge the result data together and to initiate or even influence the respective movement picking process of the different robots. This exemplary variant can be preferred in a case where for example, the effort for merging together result data is rather high, for example for a robot system with a plurality of robots.

Each processing unit can transmit first sensor data analysis results back to such a further processing unit, such as a control PC workstation which is supervising the whole process. In turn the control PC workstation can distribute the results to the robot controller, which actually use these results to adjust robot movement. In this variant, the sensor data processing units do not need to be aware of each other, because, for example, only the control PC workstation may need to have a list of connected robot controllers. However, this variant introduces a network delay for the additional round-trip to the control PC workstation and then the robot controllers.

According to another exemplary variant, the result-data of the analysis of the second measurement data fed into the network bus are directly transmittable to dedicated robot controllers via the network bus. This is an exemplary solution in the case that the effort for merging together the result data is rather low, for example if the robot system includes only two or three robots.

Each processing unit can send sensor data analysis results directly to the robot controller responsible for processing for example a scanned item. In this variant, no redirection via a further respective processing unit to a control PC workstation is needed, whereby the network latency can be reduced in an advantageous way.

In a further exemplary variant, at least one distributed sensor means includes processing means for analyzing the measurement data. This could be an integrated pre-analysis of a picture for example for extracting some features such as number or approximate position of an small object on the conveyor belt. The data traffic on the network bus for data transmission will be reduced by this. Furthermore such sensor related pre-processing with dedicated hardware can be rather fast.

In a further exemplary embodiment, the robot system comprises a system logical controller, which is for example, configured to take over all communication and/or coordination of the robot system with an overlaid system or neighboured production line within a production plant.

According to another exemplary variant, at least two robots are related to a common robot controller. Such multi robot controllers are known and this type of processing unit can be integrated into a robot system according to an exemplary embodiment. It is possible to include such a robot controller into the group of processing units which process second measurement values in a dynamic share of workload or not.

A method is also disclosed for analysis of the measurement data of distributed sensor means in a robot system according to an exemplary method comprising:

gathering second measurement data by at least one second sensor means feeding those measurement data into the network bus for data transmission providing those measurement data to at least two processing units connected to the network bus for data transmission analyzing of the second measurement data by the at least two processing units in the manner of a variable dynamic share of workload in-between themselves feeding the result-data of the analysis from the processing units into the network bus Exemplary advantages of this method correspond to the advantages of the system as mentioned before. This method can be continuously repeated within a time interval. So it becomes possible to continuously supervise a longer production process for example.

FIG. 1 shows an example for a control structure 10 for a known robot system. Three robot controllers 12 are connected to a common network bus 16, whereas additional robot controllers 12 are connectable to the network bus 16. Each robot controller 12 controls a related robot by providing all control signals for the desired movement of the robot. A robot program might be stored on the robot controller 12 providing at least the control of the basic movements of the robot, whereas this movement is adaptively influenceable by commands transmitted over the network bus 16. The robots may be any kind of manipulators. Several distributed sensors 14—in this case cameras—are arranged within the working environment of the robots 12. The measurement data of the cameras 12 are transmittable over the data connection lines 22 directly to a control computer (e.g., PC) workstation 22, which is also connected to the network bus 16 and which might be a normal industrial computer (e.g., PC).

An exemplary control PC workstation 22 includes analyzing software stored thereon and is responsible for analyzing all incoming measurement data. A differentiation in-between time-critical and less time-critical measurement data is not foreseen. The result of the measurement data analysis is provided on the network bus 16 so that all robot controllers 12 connected therewith have access to their dedicated instructions based on the analyzed data. In case of a pick and place system this information could include which object on the conveyor belt has to be picked and where the position of the object is.

A system logical controller 18 can be configured to exchange data from this robot system to another robot system or to an overlaid control system. Dependent on the actual workload of each robot, the robot controllers 12 might be rather under-loaded whereas the control PC workstation might be over-loaded under certain circumstances.

Figure 2:
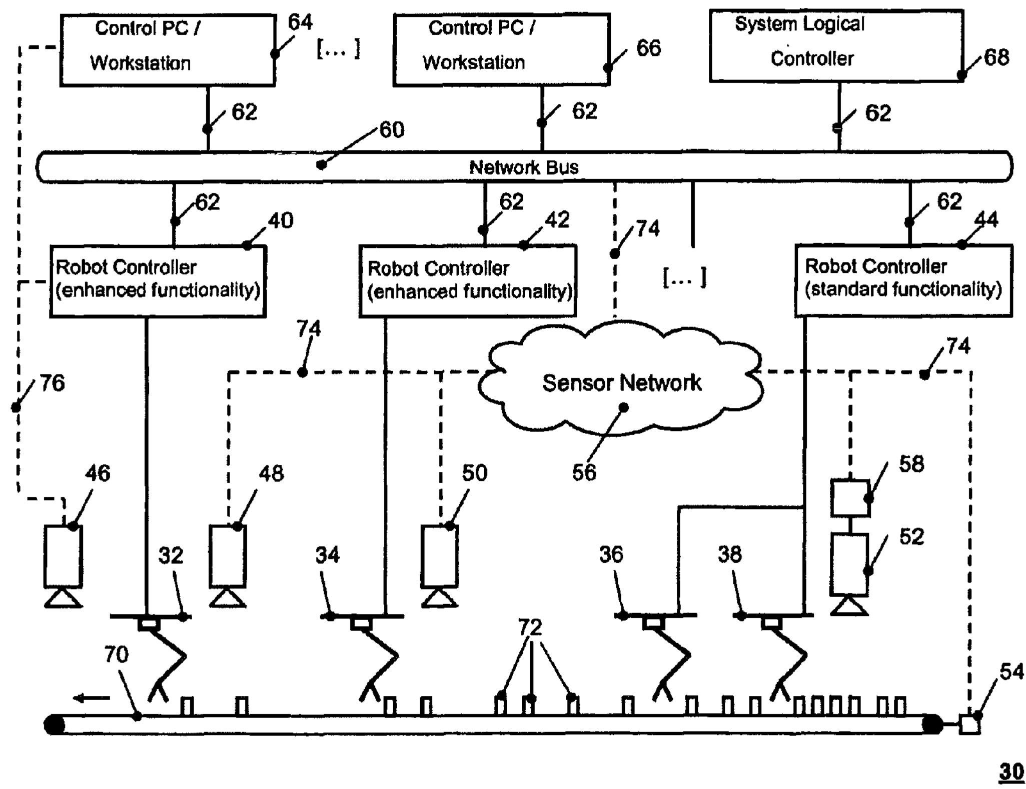
FIG. 2 shows an exemplary robot system and control structure as disclosed herein.

FIG. 2 shows an example for a robot system 30 with a control structure as disclosed herein. Four robots 32, 34, 36, 38 for pick and place applications are arranged over a conveyor belt 70, where a plurality of small objects 72 can be placed. The conveyor belt 70 is moving in the direction as indicated with an arrow. The distribution of the small objects 72 may vary in a broad range whereas it is possible that from time to time clusters of small objects 72 are placed on the right side of the conveyor belt 70. The robots 32, 34, 36, 38 can be robots with three degrees of freedom in movement, whereas a gripper tool is attached to the tip of the belonging robot arm. The gripper tool can grip the small objects 72 so that they are pickable by the robots and can be dropped on another place, for example a packaging on a neighboured conveyor belt in the working range of the robots 32, 34, 36, 38.

The first robot 32 and the second robot 34 are each controlled by a related robot controller 40, 42. A robot controller provides the control signals to the robot, which can be seen as manipulator. Each degree of freedom in movement of a manipulator can involve a dedicated motor drive, such as electric. Therefore the robot controller might generate the controlled energy supply for the relevant electro motors by amplifiers, so that the robot tip moves along a desired path. The principal movement of a robot 32, 34, 36, 38 can be determined by a movement program, which might be stored in the memory of the relevant robot controller 40, 42, 44. For example, those movements are influenceable by external commands, for example the coordinates and/or the orientation of an object 72 to be gripped by the robot. The robot controllers 40, 42 can be configured to receive such commands over the network bus 60, where they are connected to with the data connections 62.

A third robot controller 44 can also be connected to the network bus for data transmission 60, and this controller 44 can control the movement of the two robots 36 and 38. Two further processing units respectively control computers (e.g., PCs) 64, 66 and are also connected to the network bus 60, whereas control PCs 64, 66 are not related to any robot. An exemplary purpose of the computers 64, 66 is to provide calculation capability to the robot system 30 that enables the processing of measured data gathered by the distributed sensors 46, 48, 50, 52, 54.

The sensors 46, 48, 50, 52 can be cameras, which continuously observe the small objects 72 on the moving conveyor belt 70. Therefore each camera produces in a certain time interval—for example each 5 ms or each 1000 ms—an image. Such a rather long time of 1000 ms might be sufficient as an information interval for the basic control of the robot system in some cases but it may not be suitable for desired security aspects. Based on the analysis of those sensors each robot receives advice over the network bus 60 (e.g., which small object 72 has to be picked from the conveyor belt at what time). The camera 52 can be in addition provided with additional processing means 58 (e.g., computer or processor with memory) for performing a kind of pre-processing of the images from the camera 52. This is useful for example at the beginning of the conveyor belt 70 on the left side since the calculation effort here is rather high due to the highest density of small objects 72.

Exemplary second—not absolutely time critical—measurement data gathered by the cameras 48, 50, 52 are transmitted via a data connection 74 respectively via a sensor network 56 to the network bus 60. The sensor network 56 can include means (e.g., processor and/or firmware and/or software module) for temporarily converting data, and feed the measurement data in a suitable—e.g., digital—form into the network bus 60. The definition of a time interval, which might be seen as not absolutely time critical, depends on the frame conditions of the robot system 30. If for example the conveyor belt 70 moves at a speed of 0.1 m per second, a time span of 1 second among the analysis of two subsequent images of the same camera 48, 50, 52 can be sufficient to select the small objects 72 to be gripped based thereon. On the other hand, such a time interval should not exceed a maximum value since the functionality of such a system 30 is no longer ensured in this case.

On another hand, an exemplary maximum admissible time interval for second measurement values can be significantly lower than 1 second in the case of a fast moving conveyor belt 70, for example 2 m/s. In this exemplary case, the time interval should not exceed 50 ms at maximum to ensure the functionality of the system 30.

First measurement data are gathered by the distributed sensor means 46 and 54. The movement sensor 54 gathers the actual movement speed of the conveyor belt within a very small time interval such as 1-5 ms and provides the relevant data via the sensor network 56 to the network bus 60. The camera 46 gathers images from the end of the conveyor belt 70, where in the normal case each small object 72 should have been picked away. Another functionality of the camera 46 is to observe whether a human operator comes to close to the working range of the first robot 32. The end of the conveyor belt 72 might be the only location within the robot system 30, which is not protected by a not shown security wall against entering personnel. Therefore an exemplary objective of the camera 46 are security aspects, so that gathered and absolutely time critical first measurement data are directly transmitted to dedicated processing units 40, 64 where an emergency stop might be initiated therethrough.

The robot controllers 40, 42 can be provided with additional capability for data processing. The analysis of the second measurement data provided on the network bus 60 can be preferred by those two robot controllers in cooperation with the further processing units respectively (e.g., control PCs 64, 66). Which processing unit 40, 42, 64, 66 respectively and which robot controller takes over which working task or working package depends, for example, on actual unused calculation capacities of each processing unit 40, 42, 64, 66, so that the available processing capability of the robot system 30 is used in an optimized way.

The exemplary control PC 64 can be a master controller which coordinates the robots 32, 34, 36, 38, collects the result of the measurement data analysis and distributes the relevant commands or information to the relevant robot controllers 40, 42, 44. A system logical controller 68 can be configured to communicate with an overlaid control system or other neighbouring robot systems.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

List of Reference Signs

10 example for a control structure for a known robot system
12 known robot controller
14 camera
16 standard network bus for data transmission
18 first system logical controller
20 control PC
22 data connection
30 robot system with control structure
32 first robot
34 second robot
36 third robot
38 forth robot
40 first robot controller
42 second robot controller
44 third robot controller
46 first camera
48 second camera
50 third camera
52 forth camera
54 movement sensor
56 sensor network
58 processing means
60 network bus for data transmission
62 data connection to network bus
64 first control PC
66 second control PC
68 second system logical controller
70 conveyor belt for transportation of small objects
72 small objects
74 first data connection
76 second data connection

The invention claimed is:

1. Robot system comprising:

at least two robots;

at least two processing units, the processing units being connected to each other via a network bus for data transmission and each being related to a respective robot of the at least two robots; and distributed sensor means for gathering first and/or second measurement data within a local extension of the robot system, the first measurement data gathered by at least one first sensor means being transmissible to at least one of the processing of the at least two processing units that is related thereto, and second measurement data gathered by at least one second sensor means being feedable into the network bus and provided to the at least two processing units connected thereto for analyzing the second measurement data as a variable dynamic share of processing unit workload, the at least two processing units being configured to feed analysis result-data into the network bus;

wherein the first measurement data are data to be analyzed in less than a predetermined length of time and the second measurement data are data to be analyzed in greater than the predetermined length of time.

2. Robot system according to claim 1, comprising:

at least one conveyor belt for transportation of small objects, the at least two robots being configured for pick and place applications of small objects.

3. Robot system according to claim 1, wherein the at least one distributed sensor means is a camera, a light sensor or a weight sensor.

4. Robot system according to claim 1, wherein each processing unit related to the robot is a robot controller which comprises:

processing means for processing and analyzing measurement data.

5. Robot system according to claim 4, comprising:

at least two robots related to a common processing unit.

6. Robot system according to claim 1, comprising:

at least one further processing unit, not related to a robot, and connected to the network bus for data transmission and for analyzing the second measurement data as a variable dynamic share of workload among the processing units, the processing units being configured for feeding analysis result-data into the network bus.

7. Robot system according to claim 6, wherein the one further processing unit is configured with memory to store the analysis result-data of the second measurement data for transmission to dedicated processing units via the network bus.

8. Robot system according to claim 6, configured for transmitting the analysis result-data of the second measurement data directly to dedicated processing units via the network bus.

9. Robot system according to claim 1, wherein the first measurement data of the at least one first sensor means are transmissible via a separate data line and/or a sensor network to the network bus for data transmission to a processing unit related thereto.

10. Robot system according to claim 1, wherein the second measurement data are provided with a timestamp.

11. Robot system according to claim 1, wherein the at least one distributed sensor means comprises:

pre-processing means for analyzing the measurement data.

12. Robot system according to claim 1, comprising:

a system logical controller.

13. Robot system according to claim 1, wherein the processing units are configured to adjust the variable dynamic share of workload for the analysis of second measurement data among the processing units according to the actual unused workload capacities of the processing units.

14. Robot system according to claim 13, wherein the processing units are configured to analyze the second measurement data as a plurality of solitary and exactly defined working packages.

15. Robot system according to claim 13, wherein the workload for the analysis of second measurement data among the processing units is adjustable according to a round robin method.

16. Robot system according to claim 13, wherein the processing units are configured to request new second measurement data from the second sensors means, if they have unused workload capacities.

17. The method according to claim 1, wherein the first measurement data are data to be analyzed at 10 ms or less.

18. Method for analysis of measurement data of distributed sensors in a robot system having at least two robots, and at least two processing units, the at least two processing units each being related to a respective robot of the at least two robots the method comprising:

gathering first measurement data by at least one first sensor;

transmitting the first measurement data to at least one processing unit of the at least two processing units that is related to the at least one first sensor;

gathering second measurement data by at least one second sensor;

feeding the second measurement data into a network bus for data transmission;

providing the second measurement data to the at least two processing units of the at least two robots connected to the network bus for data transmission;

analyzing the second measurement data by the at least two processing units as a variable dynamic share of workload among the processing units; and feeding analysis result-data of the second measurement data by the at least two processing units into the network bus, wherein the first measurement data are data to be analyzed in less than a predetermined length of time and the second measurement data are data to be analyzed in greater than the predetermined length of time.

19. Method according to claim 18, comprising:

continuously repeating the gathering, feeding of the second measurement data, providing, analyzing, and feeding of the analysis result-date within a time interval.

20. The method according to claim 18, wherein the first measurement data are data to be analyzed 10 ms or less.

* * * * *